United States Patent
Weng et al.

(10) Patent No.: US 7,923,491 B2
(45) Date of Patent: Apr. 12, 2011

(54) GRAPHITE NANOCOMPOSITES

(75) Inventors: Weiqing Weng, Houston, TX (US);
David Lohse, Bridgewater, NJ (US);
Miguel O. Mota, Houston, TX (US);
Adriana S. Silva, Houston, TX (US);
Edward N. Kresge, Neshanic Station, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 259 days.

(21) Appl. No.: 12/188,854

(22) Filed: Aug. 8, 2008

(65) Prior Publication Data

US 2010/0036023 A1 Feb. 11, 2010

(51) Int. Cl.
*C08K 5/47* (2006.01)
*C08K 3/36* (2006.01)

(52) U.S. Cl. ............ 524/13; 524/83; 524/577; 524/551; 524/502; 524/528; 524/451; 524/449; 524/525; 524/521; 977/734

(58) Field of Classification Search .................... 524/13, 524/83, 577, 551, 502, 528, 451, 449, 525, 524/521; 977/734
See application file for complete search history.

(56) References Cited

U.S. PATENT DOCUMENTS

| | | | |
|---|---|---|---|
| 4,279,284 A | 7/1981 | Spadone | |
| 4,472,538 A | 9/1984 | Kamigaito et al. | |
| 4,525,430 A | 6/1985 | Bourgois | |
| 4,810,734 A | 3/1989 | Kawasumi et al. | |
| 4,889,885 A | 12/1989 | Usuki et al. | |
| 5,005,625 A | 4/1991 | Klemmensen et al. | |
| 5,013,793 A | 5/1991 | Wang et al. | |
| 5,162,409 A | 11/1992 | Mroczkowski | |
| 5,162,445 A | 11/1992 | Powers et al. | |
| 5,178,702 A | 1/1993 | Frerking, Jr. et al. | |
| 5,234,987 A | 8/1993 | Hubbard et al. | |
| 5,242,727 A | 9/1993 | Briddell et al. | |
| 5,397,832 A | 3/1995 | Ellul | |
| 5,532,312 A | 7/1996 | Gursky et al. | |
| 5,548,029 A | 8/1996 | Powers et al. | |
| 5,576,372 A | 11/1996 | Kresge et al. | |
| 5,576,373 A | 11/1996 | Kresge et al. | |
| 5,631,316 A | 5/1997 | Costemalle et al. | |
| 5,665,183 A | 9/1997 | Kresge et al. | |
| 5,684,077 A | 11/1997 | Tracey et al. | |
| 5,698,640 A | 12/1997 | Duvdevani et al. | |
| 5,733,621 A | 3/1998 | Cotsakis et al. | |
| 5,755,899 A | 5/1998 | Hecker et al. | |
| 5,807,629 A | 9/1998 | Elspass et al. | |
| 5,883,173 A | 3/1999 | Elspass et al. | |
| 5,936,023 A | 8/1999 | Kato et al. | |
| 5,964,969 A | 10/1999 | Sandstrom et al. | |
| 5,973,053 A | 10/1999 | Usuki et al. | |
| 6,034,164 A | 3/2000 | Elspass et al. | |
| 6,060,549 A | 5/2000 | Li et al. | |
| 6,103,817 A | 8/2000 | Usuki et al. | |
| 6,346,571 B1 | 2/2002 | Dharmarajan et al. | |
| 6,397,912 B1 | 6/2002 | Watanabe et al. | |
| 6,548,585 B1 | 4/2003 | Ozawa et al. | |
| 6,710,116 B1 | 3/2004 | Waddell et al. | |
| 2006/0066012 A1 | 3/2006 | Yang et al. | |
| 2006/0229404 A1 | 10/2006 | Lechtenboehmer | |
| 2007/0015853 A1 | 1/2007 | Weng et al. | |

FOREIGN PATENT DOCUMENTS

| | | |
|---|---|---|
| EP | 0 314 416 | 5/1989 |
| EP | 0 376 558 | 7/1990 |
| EP | 0 682 071 | 11/1995 |
| EP | 1 548 057 | 6/2005 |
| EP | 1 710 274 B1 * | 10/2006 |
| EP | 1 710 274 | 5/2007 |
| JP | 03-028244 | 2/1991 |
| JP | 05-179068 | 7/1993 |
| JP | 11-005874 | 1/1999 |
| WO | WO 03/060002 | 7/2003 |
| WO | WO 2008/042025 | 4/2008 |

OTHER PUBLICATIONS

Nielsen, Models for the Permeability of Filled Polymer Systems, J. Macromol. Sci. (Chem.), 1967, A1(5), pp. 929-942.
Technical Bulletin 226, GrafGuard Expandable Graphite Flake, TB226-GG-GG-DESC.doc, updated Jul. 20, 2006, www.grafguard.com, pp. 1-2.
Gusev et al., Rational Design of Nanocomposites for Barrier Applications, Advanced Materials, 2001, vol. 13, Issue 21, pp. 1641-1643.
Katsnelson, Graphene: carbon in two dimensions, Materials Today, Jan.-Feb. 2007, vol. 10, No. 1-2, pp. 20-27.
U.S. Appl. No. 11/183,361, Split-Stream Process for Making Nanocomposites, Weng et al., filed Jul. 18, 2005.

* cited by examiner

*Primary Examiner* — Robert D. Harlan
(74) *Attorney, Agent, or Firm* — Nancy T. Krawczyk; Catherine L. Bell

(57) ABSTRACT

Elastomeric compositions comprising graphite nanoparticles (preferably graphene nanoparticles) and methods for making same. Such compositions are useful for tire innertubes and tire innerliners.

25 Claims, 2 Drawing Sheets

GRAPHITE NANOCOMPOSITES

FIELD OF THE INVENTION

This invention relates to elastomeric compositions comprising elastomer and nanoparticles of graphite, typically for use as an air barrier such as a tire innerliner or innertube, and the tire innerliner and innertube produced thereby.

BACKGROUND OF THE INVENTION

There is a continuing need to improve the heat resistance and air retention of pneumatic tires. Elastomeric materials that do so can increase the safety and performance of vehicles by maintaining the proper tire inflation for longer periods, and they can also increase fuel economy by reducing weight. A continuing problem, however, in the tire and innerliner industry is the ability to improve the processability of air barriers, such as innerliners, without compromising air retention and durability of the tire itself.

Bromobutyl and chlorobutyl rubbers are typically used for air-retention in tubeless tires. Brominated poly(isobutylene-co-p-methylstyrene) (BIMS or BIMSM), such as those disclosed in U.S. Pat. Nos. 5,162,445 and 5,698,640, have been used when heat resistance, inter alia, is of importance. The selection of ingredients for the commercial formulations of elastomers depends upon the balance of properties desired and the application and end use. For example, in the tire industry, processing properties of the green (uncured) compound in the tire plant versus in-service performance of the cured rubber tire composite, and the nature of the tire, i.e. bias versus radial tire, and passenger versus truck versus aircraft tire are all important considerations that must be balanced.

One method to alter product properties and improve air barrier properties has been to add clays (such as nanoclays or organoclays) to elastomers to form a "nanocomposite." Nanocomposites are polymer systems containing inorganic particles with at least one dimension in the nanometer range (see for example WO 2008/042025). Common types of inorganic particles used in nanocomposites are phyllosilicates, an inorganic substance from the general class of so called "nanoclays" or "clays" generally provided in an intercalated form wherein platelets or leaves of the clay are arranged in a stack in the individual clay articles with interleaf spacing usually maintained by the insertion of another compound or chemical species between the adjacent lamellae. Ideally, intercalation should take place in the nanocomposite, wherein the polymer inserts into the space or gallery between the clay surfaces. Ultimately, it is desirable to have exfoliation, wherein the polymer is fully dispersed with the individual nanometer-size clay platelets. Due to the general enhancement in air barrier qualities of various polymer blends when clays are present, there is a desire for a nanocomposite with low air permeability; especially a vulcanized elastomer nanocomposite such as used in the manufacture of tires.

The extents of dispersion, exfoliation, and orientation of platy nano-fillers such as organosilicates, mica, hydrotalcite, graphitic carbon, etc., could strongly influence the permeability of the resulting polymer nanocomposites. The barrier property of a polymer in theory is significantly improved, by an order of magnitude, with the dispersion of just a few volume percent of exfoliated high aspect-ratio platy fillers, due simply to the increased diffusion path lengths resulting from long detours around the platelets. Nielsen, *J. Macromol. Sci.* (*Chem.*), vol. A1, p. 929 (1967), discloses a simple model to determine the reduction in permeability in a polymer by accounting for the increase in tortuousity from impenetrable, planarly oriented platy fillers. Gusev et al., *Adv. Mater.*, vol. 13, p. 1641 (2001), discloses a simple stretched exponential function relating the reduction of permeability to aspect ratio times volume fraction of the platy filler that correlates well with permeability values numerically simulated by direct three-dimensional finite element permeability calculations.

For rubber compounding applications, small sub-micron fillers such as carbon black and silica are used for fatigue resistance, fracture toughness and tensile strength. Filler particles larger than a micron act tend to concentrate stress and initiate defects. Thus, platy nanofillers added to reduce permeability are desirable in elastomers. To maximize the effect of aspect ratio on permeability reduction, it is useful to maximize the degree of exfoliation and dispersion of the platelets, which are generally supplied in the form of an intercalated stack of the platelets. However, in isobutylene polymers, dispersion and exfoliation of platy nanofillers requires sufficient favorable enthalpic contributions to overcome entropic penalties. As a practical matter, it has thus proven to be very difficult to disperse ionic nanofillers such as clay into generally inert, nonpolar, hydrocarbon elastomers. The prior art has, with limited success, attempted to improve dispersion by modification of the clay particles, by modification of the rubbery polymers, by the use of dispersion aids, and by the use of various blending processes.

The "inertness" of saturated hydrocarbon polymers such as BIMSM, their low reactivity and incompatibility with most other materials, and the difficulties in adhering them to, or using them in conjunction with most other materials has restricted their use in many areas. Chemical modification of the elastomers, modification of the blend component, and the use of additional compatibilizing blend components, has been attempted. U.S. Pat. No. 5,162,445 discloses a method to improve polymer blend compatibility or blend co-curability by copolymerizing an unsaturated comonomer and/or a comonomer having reactive functionality with isobutylene. U.S. Pat. No. 5,548,029 discloses graft copolymers of isobutylene-p-methylstyrene copolymers to compatibilize blends of saturated and unsaturated elastomers.

U.S. 2006/0229404 discloses a method for making compositions of an elastomer with exfoliated graphite in which the diene monomers are polymerized in the presence of 10 phr or more exfoliated graphite so that the graphite is intercalated with the elastomer.

U.S. Pat. No. 6,548,585 discloses refrigerant hoses made with an inner tube composition of a brominated copolymer rubber such as BIMSM with an inorganic lamellar compound such as graphite, zirconium phosphate, calcogenides, talc, kaolinite, benotnite, montmorillonite, mica, chlorite, etc.

The presence of such nanoscale materials has a tendency to increase viscosity and so make the processability of the elastomeric compositions more difficult. Processing aids such as naphthenic, paraffinic, and aliphatic resins can be added to the elastomeric compositions to combat such issues. See, for example, U.S. Pat. No. 4,279,284. However, the improved processability due to the presence of oils and resins may result in a loss of air impermeability and undesirable color, among other undesirable effects of various other properties.

The preparation of BIMSM-clay nanocomposites from melt-blending, solution blending and an emulsion process are disclosed in commonly assigned U.S. application Ser. No. 11/183,361, Split-Stream Process for Making Nanocomposites, by W. Weng et al., filed Jul. 18, 2005; and commonly assigned U.S. application Ser. No. 11/184,000, Functionalized Isobutylene Polymer-Inorganic Clay Nanocomposites and Organic-Aqueous Emulsion Process, by W. Weng et al., filed Jul. 18, 2005 (published as U.S. Patent Publication No. 2007-0015853, Jan. 18, 2007).

There is still a need, therefore, for improving the processability of elastomeric compositions useful for tires, air barriers, among other things requiring air retention, while maintaining or improving the air impermeability of those compositions.

SUMMARY

This invention relates to an elastomeric composition, comprising:

from 0.1 to 20 phr graphite nanoparticles (preferably graphene nanoparticles);

from 1 to 99 wt % of at least one elastomer component comprising a random copolymer having at least one $C_4$ to $C_7$ isomonoolefin derived unit; and 10 to 200 phr of at least one filler that is not graphite.

Elastomeric compositions with excellent air retention properties and excellent processability are provided as are the methods for making same. In at least one specific embodiment, the elastomeric composition can include one or more nanoparticles of graphene. The composition can further include at least one elastomer component comprising a random copolymer having at least one $C_4$ to $C_7$ isomonoolefin derived unit, and optionally at least one filler.

In at least one other specific embodiment, the elastomeric composition can include one or more nanoparticles comprising graphene, at least one elastomer component consisting essentially of poly(isoolefin-co-p-methylstyrene), and at least one filler.

In at least one specific embodiment, the method can include mixing one or more nanoparticles comprising graphene into at least one elastomer component comprising a random copolymer having at least one $C_4$ to $C_7$ isomonoolefin derived unit and at least one filler, wherein the mixing step occurs at a rate sufficient to disperse the nanoparticles within the elastomer.

DETAILED DESCRIPTION

Figure 1:
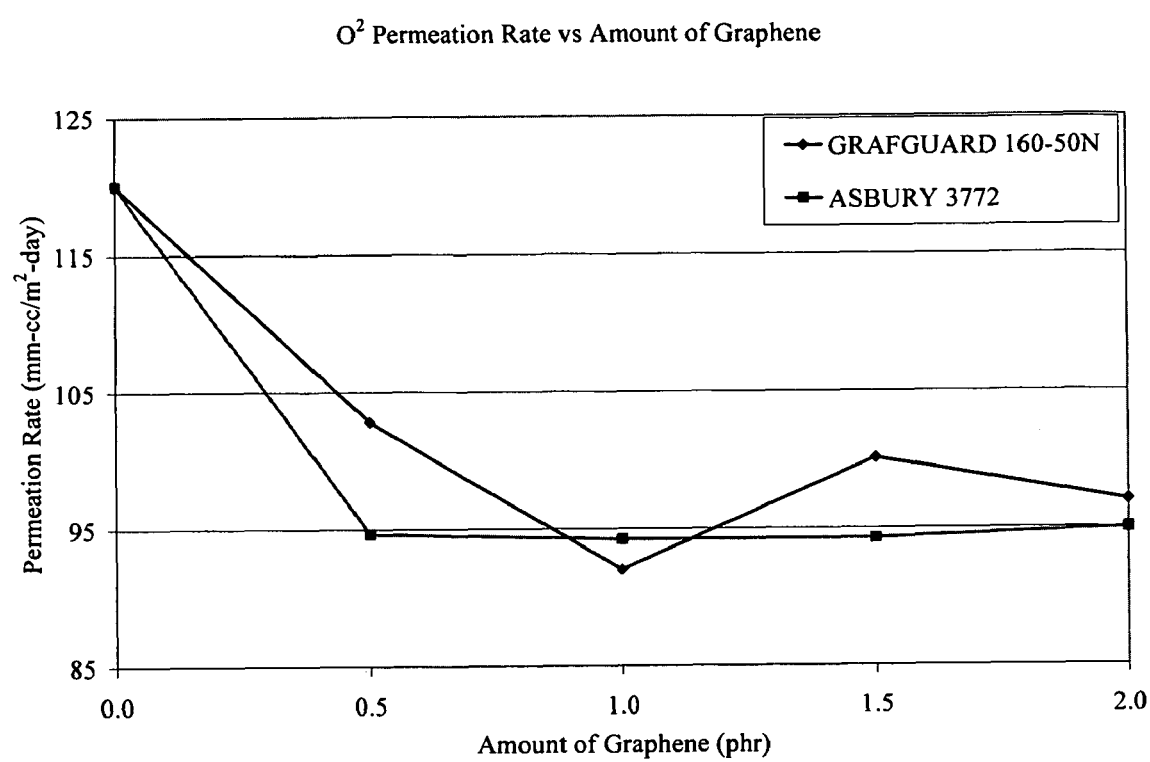
FIG. 1 graphically illustrates oxygen permeation rate versus amount of graphene in elastomer nanocomposites in accordance with one or more embodiments described.

As used herein, the new numbering scheme for the Periodic Table Groups is used as set forth in CHEMICAL AND ENGINEERING NEWS, 63(5), 27 (1985).

As used herein, "polymer" may be used to refer to homopolymers, copolymers, interpolymers, terpolymers, etc. Likewise, a copolymer may refer to a polymer comprising at least two monomers, optionally with other monomers.

As used herein, when a polymer is referred to as comprising a monomer, the monomer is present in the polymer in the polymerized form of the monomer or in the derivative form the monomer. Likewise, when catalyst components are described as comprising neutral stable forms of the components, it is well understood by one skilled in the art, that the ionic form of the component is the form that reacts with the monomers to produce polymers.

As used herein, "elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers. The terms may be used interchangeably with the term "rubber".

As used herein, "phr" is 'parts per hundred rubber' and is a measure common in the art wherein components of a composition are measured relative to a major elastomer component, based upon 100 parts by weight of the elastomer(s) or rubber(s).

As used herein, "isobutylene based elastomer" or "isobutylene based polymer" or "isobutylene based rubber" refers to elastomers or polymers comprising at least 70 mole percent isobutylene.

As used herein, "isoolefin" refers to any olefin monomer having at least one olefinic carbon having two substitutions on that carbon.

As used herein, "multiolefin" refers to any monomer having two or more double bonds, for example, a multiolefin may be any monomer comprising two conjugated double bonds such as a conjugated diene such as isoprene.

As used herein, "nanocomposite" or "nanocomposite composition" refers to polymer systems containing inorganic particles with at least one dimension in the nanometer range within a polymer matrix.

As used herein, "intercalation" refers to the state of a composition in which a material (such as an inorganic or organic molecule or ion, oligomer or polymer) is present between each layer of a platelet filler. As is recognized in the industry and by academia, some indicia of intercalation can be the shifting and/or weakening of detection of X-ray lines as compared to that of original platelet fillers, indicating a larger spacing between vermiculite layers than in the original mineral.

As used herein, "overlapping configuration" between the opposing platelet surfaces in an intercalated particle refers to an arrangement wherein the molecular tails of the intercalant from the opposing surfaces are overlapping or intertwined in a single or common layer between the platelets, whereas "double layer configuration" refers to an arrangement wherein the intercalant tails are generally end-to-end in more or less separate layers. The overlapping configuration generally manifests tighter platelet spacing, whereas the double layer configuration yields larger d spacing.

As used herein, "exfoliation" refers to the separation of individual layers of the original inorganic particle, so that polymer can surround or surrounds each separated particle. In an embodiment, sufficient polymer or other material is present between each platelet such that the platelets are randomly spaced. For example, some indication of exfoliation or intercalation may be a plot showing no X-ray lines or larger d-spacing because of the random spacing or increased separation of layered platelets. However, as recognized in the industry and by academia, other indicia may be useful to indicate the results of exfoliation such as permeability testing, electron microscopy, atomic force microscopy, etc. For purposes of this invention and claims thereto exfoliation is measured by transmission electron microscopy (TEM), on a 100 nm thick sample.

The term "aspect ratio" is understood to mean the ratio of the larger dimension of the leaves or platelets of nanofiller, to the thickness of the individual leaf or of the agglomerate or stack of leaves. The thickness of the individual leaf can be determined by crystallographic analysis techniques, whereas the larger dimension of a leaf are generally determined by analysis by transmission electron microscopy (TEM), both of which are known in the art.

The term "average aspect ratio" refers to the volume average aspect ratio, i.e., the third moment of the aspect ratio distribution, unless otherwise indicated.

As used herein, "solvent" refers to any substance capable of dissolving another substance. When the term solvent is used it may refer to at least one solvent or two or more solvents unless specified. In certain embodiments, the solvent is polar; in other embodiments, the solvent is non-polar.

As used herein, "solution" refers to a uniformly dispersed mixture at the molecular level or ionic level, of one or more substances (solute) in one or more substances (solvent). For example, solution process refers to a mixing process that both the elastomer and the modified layered filler remain in the same organic solvent or solvent mixtures.

As used herein, "suspension" refers to a system consisting of a solid dispersed in a solid, liquid, or gas usually in particles of larger than colloidal size.

As used herein, "emulsion" refers to a system consisting of a liquid or liquid suspension dispersed with or without an emulsifier in an immiscible liquid usually in droplets of larger than colloidal size.

As used herein, "hydrocarbon" refers to molecules or segments of molecules containing primarily hydrogen and carbon atoms. In some embodiments, hydrocarbon also includes halogenated versions of hydrocarbons and versions containing heteroatoms as discussed in more detail below.

As used herein, "polar group" refers to a group of atoms with asymmetrically arranged polar bonds in which the difference in electronegativity of bonding atoms, using the Linus Pauling scale of electronegativities, is greater than 0.3 and less than 1.7. In contrast to ionic groups in which there is charge separation to facilitate cation exchange with the cations between nanofiller layers, there is generally no charge separation in polar groups. Polar groups can interact with charged nanofiller surfaces, or to react with intercalates attached (chemically, ionically, or physically) to a nanofiller surface, but usually serve as dispersion aids and not generally as intercalates.

In a preferred embodiment, this invention also relates to an elastomeric composition (preferably an air barrier, preferably a tire innerliner) comprising:

1) from 0.1 to 20 phr graphite nanoparticles (preferably graphene nanoparticles);
2) from 1 to 99 wt % of at least one elastomer component comprising a random copolymer having at least one $C_4$ to $C_7$ isomonoolefin derived unit; and
3) 10 to 200 phr of at least one filler that is not graphite;
4) optionally, from 0 to 49 wt % of a thermoplastic resin (based upon the weight of the composition;
5) optionally, from 10 to 200 phr of a filler;
6) optionally, from 1 to 70 phr of processing oil; and
7) optionally, from 0.2 to 15 phr of a cure agent or accelerator.

Elastomer Component

The elastomer component can be or include one or more random copolymers having at least one $C_4$ to $C_7$ isomonoolefin derived unit. The elastomer component can be or include an elastomer having at least one isobutylene derived unit and at least one other polymerizable unit. The isobutylene-based copolymer may or may not be halogenated.

In one or more embodiments, the elastomer component can be or include poly(isobutylene-co-alkylstyrene), preferably poly(isobutylene-co-p-methylstyrene), halogenated poly (isobutylene-co-alkylstyrene), preferably halogenated poly (isobutylene-co-p-methylstyrene), star branched butyl rubber, halogenated star-branched butyl rubber, butyl rubber, halogenated butyl rubber, polyisobutylene, or mixtures thereof. In one or more embodiments, the elastomer component can be or includes bromobutyl rubber and or chlorobutyl rubber.

In one or more embodiments, the elastomer component comprises a butyl rubber or branched butyl rubber, especially halogenated versions thereof. Useful elastomers can include unsaturated butyl rubbers such as homopolymers and copolymers of olefins or isoolefins and multiolefins, or homopolymers of multiolefins. These and other types of elastomers are well known in the art and are described in Rubber Technology 209-581 (Maurice Morton ed., Chapman & Hall 1995), The Vanderbilt Rubber Handbook 105-122 (Robert F. Ohm ed., R.T. Vanderbilt Co., Inc. 1990), and Edward Kresge and H. C. Wang in 8 Kirk-Othmer Encyclopedia of Chemical Technology 934-955 (John Wiley & Sons, Inc. 4th ed. 1993). In one or more embodiments, the elastomer component can be or include unsaturated elastomers such as poly(isobutylene-co-isoprene), polyisoprene, polybutadiene, polyisobutylene, poly(styrene-co-butadiene), natural rubber, star-branched butyl rubber, and mixtures thereof.

The elastomer component can be made by any suitable means known in the art, and the invention is not herein limited by the method of producing the elastomer. For example, butyl rubbers can be prepared by reacting a mixture of monomers, the mixture having at least (1) a $C_4$ to $C_{12}$ isoolefin monomer component such as isobutylene with (2) a multiolefin, monomer component. The isoolefin can range from 70 to 99.5 wt % by weight of the total monomer mixture; or range from 85 to 99.5 wt %. The multiolefin component can be present in the monomer mixture from 30 to 0.5 wt %; or from 15 to 0.5 wt %; or from 8 to 0.5 wt %.

The isoolefin can be a $C_4$ to $C_{12}$ compound. For example, the isoolefin can be or include isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The multiolefin can be a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene, and other monomers such as disclosed in EP 0 279 456 and U.S. Pat. Nos. 5,506,316 and 5,162,425.

Other polymerizable monomers such as styrene and dichlorostyrene are also suitable for homopolymerization or copolymerization in butyl rubbers. One embodiment of the butyl rubber polymer described is obtained by reacting 92 to 99.5 wt % of isobutylene with 0.5 to 8 wt % isoprene, or from 0.5 wt % to 5.0 wt % isoprene in yet another embodiment. Butyl rubbers and methods of their production are described in detail in, for example, U.S. Pat. Nos. 2,356,128, 3,968,076, 4,474,924, 4,068,051 and 5,532,312.

A commercial example of a desirable butyl rubber is EXXON™ BUTYL Grades of poly(isobutylene-co-isoprene), having a Mooney viscosity of from 32±3 to 51±5 (ML 1+8 at 125° C.). Another commercial example of a desirable butyl-type rubber is VISTANEX™ polyisobutylene rubber having a molecular weight viscosity average of from 0.9±0.15 to 2.11±0.23×$10^6$ g/mol.

A branched or "star-branched" butyl rubber can be also be used. These rubbers are described in, for example, EP 0 678 529 B1, U.S. Pat. Nos. 5,182,333 and 5,071,913. In one or more embodiments, the star-branched butyl rubber ("SBB") is a composition of a butyl rubber, either halogenated or not, and a polydiene or block copolymer, either halogenated or not. Suitable polydienes/block copolymer, or branching agents (hereinafter "polydienes"), can be cationically reactive and are present during the polymerization of the butyl or halogenated butyl rubber, or can be blended with the butyl rubber to form the SBB. The branching agent or polydiene can be any suitable branching agent, and the invention is not limited to the type of polydiene used to make the SBB.

In one or more embodiments, the SBB is a composition of the butyl or halogenated butyl rubber as described above and a copolymer of a polydiene and a partially hydrogenated polydiene selected from the group including styrene, polybutadiene, polyisoprene, polypiperylene, natural rubber, styrene-butadiene rubber, ethylene-propylene diene rubber (EPDM), ethylene-propylene rubber (EPM), styrene-butadiene-styrene and styrene-isoprene-styrene block copolymers. These polydienes are present, based on the monomer wt %, in an amount greater than 0.3 wt %, or from 0.3 to 3 wt %, or from 0.4 to 2.7 wt %.

A commercial embodiment of a SBB is SB Butyl 4266 (ExxonMobil Chemical Company, Houston Tex.), having a Mooney viscosity (ML 1+8 at 125° C., ASTM D 1646) of from 34 to 44. Further, cure characteristics of SB Butyl 4266 are as follows: MH is 69±6 dN·m, ML is 11.5±4.5 dN·m (ASTM D2084).

The elastomer component or parts thereof can be halogenated. Preferred halogenated rubbers include bromobutyl rubber, chlorobutyl rubber, brominated copolymers of isobutylene and para-methylstyrene, brominated copolymers of isobutylene and para-methylstyrene, and mixtures thereof. Halogenated butyl rubber is produced by the halogenation of the butyl rubber product described above. Halogenation can be carried out by any means, and the invention is not herein limited by the halogenation process. Methods of halogenating polymers such as butyl polymers are disclosed in U.S. Pat. Nos. 2,631,984, 3,099,644, 4,554,326, 4,681,921, 4,650,831, 4,384,072, 4,513,116 and 5,681,901. In one or more embodiments, the butyl rubber is halogenated in hexane diluent at from 4 to 60° C. using bromine ($Br_2$) or chlorine ($Cl_2$) as the halogenation agent. The halogenated butyl rubber has a Mooney Viscosity of from 20 to 70 (ML 1+8 at 125° C.), or from 25 to 55. The halogen wt % is from 0.1 to 10 wt % based in on the weight of the halogenated butyl rubber, or from 0.5 to 5 wt %. In yet another embodiment, the halogen wt % of the halogenated butyl rubber is from 1 to 2.5 wt %.

A commercial embodiment of the halogenated butyl rubber is Bromobutyl 2222 (ExxonMobil Chemical Company). Its Mooney Viscosity is from 27 to 37 (ML 1+8 at 125° C., ASTM 1646, modified), and the bromine content is from 1.8 to 2.2 wt % relative to the Bromobutyl 2222. Further, cure characteristics of Bromobutyl 2222 are as follows: MH is from 28 to 40 dN·m, ML is from 7 to 18 dN·m (ASTM D2084). Another commercial embodiment of the halogenated butyl rubber is Bromobutyl 2255 (ExxonMobil Chemical Company). Its Mooney Viscosity is from 41 to 51 (ML 1+8 at 125° C., ASTM D1646), and the bromine content is from 1.8 to 2.2 wt %. Further, cure characteristics of Bromobutyl 2255 are as follows: MH is from 34 to 48 dN·m, ML is from 11 to 21 dN·m (ASTM D2084).

In one or more embodiments described, the elastomer can include a branched or "star-branched" halogenated butyl rubber. In one or more embodiments, the halogenated star-branched butyl rubber ("HSBB") is a composition of a butyl rubber, either halogenated or not, and a polydiene or block copolymer, either halogenated or not. The halogenation process is described in detail in U.S. Pat. Nos. 4,074,035; 5,071,913; 5,286,804; 5,182,333; and 6,228,978. The invention is not limited by the method of forming the HSBB. The polydienes/block copolymer, or branching agents (hereinafter "polydienes"), are typically cationically reactive and are present during the polymerization of the butyl or halogenated butyl rubber, or can be blended with the butyl or halogenated butyl rubber to form the HSBB. The branching agent or polydiene can be any suitable branching agent, and the invention is not limited to the type of polydiene used to make the HSBB.

In one or more embodiments, the HSBB is a composition of the butyl or halogenated butyl rubber as described above and a copolymer of a polydiene and a partially hydrogenated polydiene selected from the group including styrene, polybutadiene, polyisoprene, polypiperylene, natural rubber, styrene-butadiene rubber, ethylene-propylene diene rubber, styrene-butadiene-styrene and styrene-isoprene-styrene block copolymers. These polydienes are present, based on the monomer wt %, in an amount greater than 0.3 wt %, or from 0.3 to 3 wt %, or from 0.4 to 2.7 wt %.

A commercial embodiment of the HSBB is Bromobutyl 6222 (ExxonMobil Chemical Company), having a Mooney Viscosity (ML 1+8 at 125° C., ASTM D1646) of from 27 to 37, and a bromine content of from 2.2 to 2.6 wt % relative to the HSBB. Further, cure characteristics of Bromobutyl 6222 are as follows: MH is from 24 to 38 dN·m, ML is from 6 to 16 dN·m (ASTM D2084).

In one or more embodiments, the elastomer component can be an isoolefin copolymer comprising a halomethylstyrene derived unit. The halomethylstyrene unit can be an ortho-, meta-, or para-alkyl-substituted styrene unit. The halomethylstyrene derived unit can be a p-halomethylstyrene having at least 80%, more preferably at least 90% by weight of the para-isomer. The "halo" group can be any halogen, desirably chlorine or bromine. The halogenated elastomer may also include functionalized interpolymers wherein at least some of the alkyl substituents groups present in the styrene monomer units contain benzylic halogen or some other functional group described further below. These interpolymers are herein referred to as "isoolefin copolymers comprising a halomethylstyrene derived unit" or simply "isoolefin copolymer".

The isoolefin of the copolymer can be a $C_4$ to $C_{12}$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The copolymer can also further include one or more multiolefin derived units. The multiolefin can be a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene, and other monomers such as disclosed in EP 0 279 456 and U.S. Pat. Nos. 5,506,316 and 5,162,425. Desirable styrenic monomer derived units that may comprise the copolymer include styrene, methylstyrene, chlorostyrene, methoxystyrene, indene and indene derivatives, and combinations thereof.

In at least one specific embodiment, the elastomer component can be a random elastomeric copolymer of an ethylene derived unit or a $C_3$ to $C_6$ a-olefin derived unit and an halomethylstyrene derived unit, preferably p-halomethylstyrene containing at least 80%, more preferably at least 90% by weight of the para-isomer and also include functionalized interpolymers wherein at least some of the alkyl substituents groups present in the styrene monomer units contain benzylic halogen or some other functional group. Suitable interpolymers can include any of the following monomer units randomly spaced along the polymer chain:

1.

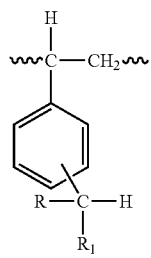

2.

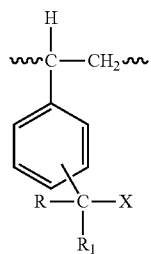

wherein R and $R^1$ are independently hydrogen, lower alkyl, preferably $C_1$ to $C_7$ alkyl and primary or secondary alkyl halides and X is a functional group such as a halogen, triethylammonium, trimethylammonium, or other functional group. Desirable halogens include chlorine, bromine or combinations thereof. Preferably R and $R^1$ are each hydrogen. The —$CRR_1H$ and —$CRR_1X$ groups can be substituted on the styrene ring in either the ortho, meta, or para positions, preferably para. Up to 60 mole % of the p-substituted styrene present in the interpolymer structure can be the functionalized structure (2) above or from 0.1 to 5 mol %. In yet another embodiment, the amount of functionalized structure (2) is from 0.4 to 1 mol %.

In one or more embodiments, the functional group X can be a functional group that can be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof. These functionalized isomonoolefin copolymers, their method of preparation, methods of functionalization, and cure are more particularly disclosed in U.S. Pat. No. 5,162,445.

Most useful of such functionalized materials are elastomeric random interpolymers of isobutylene and alkylstyrene, preferably p-methylstyrene, containing from 0.5 to 20 mole % alkylstyrene, preferably p-methylstyrene, wherein up to 60 mole % of the methyl substituent groups present on the benzyl ring contain a bromine or chlorine atom, preferably a bromine atom (p-bromomethylstyrene), as well as acid or ester functionalized versions thereof wherein the halogen atom has been displaced by maleic anhydride or by acrylic or methacrylic acid functionality. These interpolymers are termed "halogenated poly(isobutylene-co-p-methylstyrene)" or "brominated poly(isobutylene-co-p-methylstyrene)", and are commercially available under the name EXXPRO™ Elastomers (ExxonMobil Chemical Company, Houston Tex.). It is understood that the use of the terms "halogenated" or "brominated" are not limited to the method of halogenation of the copolymer, but merely descriptive of the copolymer which can include the isobutylene derived units, the p-methylstyrene derived units, and the p-halomethylstyrene derived units.

These functionalized polymers preferably have a substantially homogeneous compositional distribution such that at least 95% by weight of the polymer has a p-alkylstyrene content within 10% of the average p-alkylstyrene content of the polymer. More preferred polymers are also characterized by a narrow molecular weight distribution (Mw/Mn) of less than 5, more preferably less than 2.5, a preferred viscosity average molecular weight in the range of from 200,000 up to 2,000,000 and a preferred number average molecular weight in the range of from 25,000 to 750,000 as determined by gel permeation chromatography.

The copolymers can be prepared by a slurry polymerization of the monomer mixture using a Lewis acid catalyst, followed by halogenation, preferably bromination, in solution in the presence of halogen and a radical initiator such as heat and/or light and/or a chemical initiator and, optionally, followed by electrophilic substitution of bromine with a different functional derived unit.

Preferred halogenated poly(isobutylene-co-alkylstyrene), preferably halogenated poly(isobutylene-co-p-methylstyrene), are brominated polymers which generally contain from 0.1 to 5 wt % of bromomethyl groups. In yet another embodiment, the amount of bromomethyl groups is from 0.2 to 2.5 wt %. Expressed another way, preferred copolymers contain from 0.05 up to 2.5 mole % of bromine, based on the weight of the polymer, more preferably from 0.1 to 1.25 mole % bromine, and are substantially free of ring halogen or halogen in the polymer backbone chain. In one or more embodiments described, the interpolymer is a copolymer of $C_4$ to $C_7$ isomonoolefin derived units and alkylstyrene, preferably a p-methylstyrene, derived units and preferably a p-halomethylstyrene derived units, wherein the p-halomethylstyrene units are present in the interpolymer from 0.4 to 1 mol % based on the interpolymer. In one or more embodiments, the p-halomethylstyrene is p-bromomethylstyrene. The Mooney Viscosity (1+8, 125° C., ASTM D1646, modified) is from 30 to 60 MU.

In one or more embodiments, the elastomeric component can include various amounts of one, two, or more different elastomers. For example, embodiments of compositions described may contain from 5 to 100 phr of halogenated butyl rubber, from 5 to 95 phr of star-branched butyl rubber, from 5 to 95 phr of halogenated star-branched butyl rubber, or from 5 to 95 phr of halogenated poly(isobutylene-co-alkylstyrene), preferably halogenated poly(isobutylene-co-p-methylstyrene). In one or more embodiments, the compositions contain from 40 to 100 phr of halogenated poly(isobutylene-co-alkylstyrene), preferably halogenated poly(isobutylene-co-p-methylstyrene), and/or from 40 to 100 phr of halogenated star-branched butyl rubber (HSBB).

In one or more preferred embodiments, the elastomer component can be or include natural rubbers, polyisoprene rubber, styrene butadiene rubber (SBR), polybutadiene rubber, isoprene butadiene rubber (IBR), styrene-isoprene-butadiene rubber (SIBR), ethylene-propylene rubber, ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; poly(isobutylene-co-alkylstyrene), preferably isobutylene/methylstyrene copolymers such as isobutylene/meta-bromomethylstyrene, isobutylene/bromomethylstyrene, isobutylene/chloromethylstyrene, halogenated isobutylene cyclopentadiene, and isobutylene/chloromethylstyrene and mixtures thereof.

In some embodiments, the elastomeric composition described herein may further comprise a secondary elastomer component selected from the group consisting of natural rubbers, polyisoprene rubber, styrene butadiene rubber (SBR), polybutadiene rubber, isoprene butadiene rubber (IBR), styrene-isoprene-butadiene rubber (SIBR), ethylene-propylene rubber, ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; isobutylene/methylstyrene copolymers such as isobutylene/meta-bromomethylstyrene, isobutylene/bromomethylstyrene, isobutylene/chloromethylstyrene, halogenated isobutylene cyclopentadiene, and isobutylene/chloromethylstyrene and mixtures thereof. In other embodiments the elastomeric composition described herein has less than 10 phr, preferably 0 phr of a secondary elastomer component, preferably 0 phr of the elastomers described above as "secondary elastomer component".

In at least one specific embodiment, the elastomer composition can include natural rubber. Natural rubbers are described in detail by *Subramanian* in Rubber Technology 179-208 (1995). Natural rubbers can include those selected from the group consisting of Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646.

Some commercial examples of synthetic rubbers include NATSYN™ (Goodyear Chemical Company), and BUDENE™ 1207 or BR 1207 (Goodyear Chemical Company). A desirable rubber is high cis-polybutadiene (cis-BR). By "cis-polybutadiene" or "high cis-polybutadiene", it is meant that 1,4-cis polybutadiene is used, wherein the amount of cis component is at least 95%. An example of high cis-polybutadiene commercial products used in the composition BUDENE™ 1207. A suitable ethylene-propylene rubber is commercially available as VISTALON™ (ExxonMobil Chemical Company).

In one or more embodiments, the elastomer component can include one or more semi-crystalline copolymers (SCC). Semi-crystalline copolymers are described in U.S. Pat. No. 6,326,433. Generally, the SCC is a copolymer of ethylene or propylene derived units and α-olefin derived units, the α-olefin having from 4 to 16 carbon atoms, and in one or more embodiments, the SCC is a copolymer of ethylene derived units and α-olefin derived units, the α-olefin having from 4 to 10 carbon atoms, wherein the SCC has some degree of crystallinity. In a further embodiment, the SCC is a copolymer of 1-butene derived units and another α-olefin derived unit, the other α-olefin having from 5 to 16 carbon atoms, wherein the SCC also has some degree of crystallinity. The SCC can also be a copolymer of ethylene and styrene.

In one or more embodiments, the functional group X is a combination of a halogen and a triethylammonium functional group that can be incorporated by a nucleophilic substitution of benzylic halogen with triethylamine (TEA), or trimethylamine (TMA). Most useful of such functionalized materials are elastomeric random interpolymers of isobutylene and para-methylstyrene containing from 0.5 to 20 mole percent para-methylstyrene, wherein up to 60 mole percent of the methyl substituent groups present on the benzyl ring contain a mixture of halogen, e.g. a chlorine or preferably a bromine atom (para(bromomethylstyrene)), and triethylammonium, and can optionally include other functional groups such as ester and ether.

Such functionalized interpolymers can have a substantially homogeneous compositional distribution such that at least 95% by weight of the elastomer has a para-alkylstyrene content within 10% of the average para-alkylstyrene content of the polymer. Desirable interpolymers can also be characterized by a narrow molecular weight distribution (Mw/Mn) of less than 5, more preferably less than 2.5, a preferred viscosity average molecular weight in the range of from 200,000 up to 2,000,000, and a preferred number average molecular weight in the range of from 25,000 to 750,000 as determined by gel permeation chromatography.

The functionalized elastomers can be prepared by a slurry polymerization of the monomer mixture using a Lewis acid catalyst, followed by halogenation, preferably bromination, in solution in the presence of halogen and a radical initiator such as heat and/or light and/or a chemical initiator, and followed by electrophilic substitution of bromine with a different functional moiety such as triethylammonium. Preferred functionalized elastomers generally contain from 0.1 to 5 mole percent of functionalized-methylstyrene groups relative to the total amount of monomer derived units in the polymer. In another embodiment, the total amount of bromomethyl and TEA-methyl groups can be from 0.2 to 3.0 mole percent, from 0.3 to 2.8 mole percent in yet another embodiment, from 0.4 to 2.5 mole percent in yet another embodiment, and from 0.3 to 2.0 in yet another embodiment, wherein a desirable range may be any combination of any upper limit with any lower limit. Expressed another way, preferred copolymers can contain from 0.2 to 10 weight percent of total bromine and TEA, based on the weight of the polymer, from 0.4 to 7 weight percent total bromine and TEA in another embodiment, and from 0.6 to 6 weight percent in another embodiment, and can be substantially free of ring halogen or halogen in the polymer backbone chain. The molar ratio of TEA-methyl to bromomethyl in the TEA-BIMS polymer can range from a lower limit of 1:100, 1:50, 1:20, or 1:10, to an upper limit of 1:1, 1:2, 1:3, or 1:4, wherein a desirable range may be any combination of any upper limit with any lower limit.

In a preferred embodiment, the elastomer is or includes a copolymer of $C_4$ to $C_7$ isoolefin derived units (or isomonoolefin), para-methylstyrene derived units (PMS), para-(bromomethylstyrene) derived units (BrPMS), and/or para-(triethylammoniummethylstyrene) derived units (TEAPMS), wherein the TEAPMS units are present in the interpolymer from 0.1 to 1.0 mole percent based on the total moles of isoolefin and PMS, BrPMS units are present in the interpolymer from 0.3 to 3.0 mole percent based on the total moles of isoolefin and PMS, and the PMS derived units are present from 3 to 15 weight percent based on the total weight of the polymer in one embodiment, and from 4 weight percent to 10 weight percent in another embodiment.

In one or more embodiments above or elsewhere herein, the elastomer composition can include up to 99 wt % of the one or more elastomeric components or elastomers. In one or more embodiments, the elastomer composition can contain of from 30 to 99 wt % of the one or more elastomeric components or elastomers. In one or more embodiments, the elastomer composition can contain of from 35 to 90 wt % of the one or more elastomeric components or elastomers. In one or more embodiments, the elastomer composition can contain of from 40 to 85 wt % of the one or more elastomeric components or elastomers. In one or more embodiments, the elastomer composition can contain of from 40 to 80 wt % of the one or more elastomeric components or elastomers. In one or more embodiments, the elastomer composition can contain of from 40 to 60 wt % of the one or more elastomeric components or elastomers.

Thermoplastic Resin

The elastomeric composition can include one or more thermoplastic resins. Suitable thermoplastic resins include polyolefins, nylons, and other polymers. Suitable thermoplastic resins can be or include resins containing nitrogen, oxygen, halogen, sulfur or other groups capable of interacting with one or more aromatic functional groups such as a halogen or acidic groups.

Suitable thermoplastic resins include polyamides, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK) and mixtures thereof.

Suitable thermoplastic polyamides (nylons) can include crystalline or resinous, high molecular weight solid polymers including copolymers and terpolymers having recurring amide units within the polymer chain. Polyamides can be prepared by polymerization of one or more epsilon lactams such as caprolactam, pyrrolidione, lauryllactam and aminoundecanoic lactam, or amino acid, or by condensation of dibasic acids and diamines. Both fiber-forming and molding grade nylons are suitable. Examples of such polyamides are polycaprolactam (nylon-6), polylauryllactam (nylon-12), polyhexamethyleneadipamide (nylon-6,6) polyhexamethyleneazelamide (nylon-6,9), polyhexamethylenesebacamide (nylon-6,10), polyhexamethyleneisophthalamide (nylon-6, IP) and the condensation product of 11-amino-undecanoic acid (nylon-11). Additional examples of satisfactory polyamides (especially those having a softening point below 275° C.) are described in 16 Encyclopedia of Chemical Technology 1-105 (John Wiley & Sons 1968), Concise Encyclopedia of Polymer Science and 748-761 (John Wiley & Sons, 1990), and 10 Encyclopedia of Polymer Science and Technology 392-414 (John Wiley & Sons 1969). Commercially available thermoplastic polyamides can be advantageously used with linear crystalline polyamides having a softening point or melting point between 160 and 260° C. being preferred.

Suitable thermoplastic polyesters can further include the polymer reaction products of one or a mixture of aliphatic or aromatic polycarboxylic acids esters of anhydrides and one or a mixture of diols. Examples of satisfactory polyesters include poly (trans-1,4-cyclohexylene $C_{2-6}$ alkane dicarboxylates such as poly(trans-1,4-cyclohexylene succinate) and poly (trans-1,4-cyclohexylene adipate); poly (cis or trans-1,4-cyclohexanedimethylene)alkanedicarboxylates such as poly(cis-1,4-cyclohexanedimethylene)oxalate and poly-(cis-1,4-cyclohexanedimethylene)succinate, poly ($C_{2-4}$ alkylene terephthalates) such as polyethyleneterephthalate and polytetramethylene-terephthalate, poly ($C_{2-4}$ alkylene isophthalates such as polyethyleneisophthalate and polytetramethylene-isophthalate and like materials. Preferred polyesters are derived from aromatic dicarboxylic acids such as naphthalenic or phthalic acids and C2 to $C_4$ diols, such as polyethylene terephthalate and polybutylene terephthalate. Preferred polyesters will have a melting point in the range of 160° C. to 260° C.

Poly(phenylene ether) (PPE) thermoplastic resins which can be used are well known, commercially available materials produced by the oxidative coupling polymerization of alkyl substituted phenols. They are generally linear, amorphous polymers having a glass transition temperature in the range of 190° C. to 235° C. These polymers, their method of preparation and compositions with polystyrene are further described in U.S. Pat. No. 3,383,435.

The thermoplastic resins can further include the polycarbonate analogs of the polyesters described above such as segmented poly (ether co-phthalates); polycaprolactone polymers; styrene resins such as copolymers of styrene with less than 50 mol % of acrylonitrile (SAN) and resinous copolymers of styrene, acrylonitrile and butadiene (ABS); sulfone polymers such as polyphenyl sulfone; copolymers and homopolymers of ethylene and $C_2$ to $C_8$ α-olefins, in one or more embodiments a homopolymer of propylene derived units, and in one or more embodiments a random copolymer or block copolymer of ethylene derived units and propylene derived units, and like thermoplastic resins as are known in the art.

In one or more embodiments, the compositions can include any of the thermoplastic resins (also referred to as a thermoplastic or a thermoplastic polymer) described above that are formed into dynamically vulcanized alloys. The term "dynamic vulcanization" is used herein to connote a vulcanization process in which the engineering resin and a vulcanizable elastomer are vulcanized under conditions of high shear. As a result, the vulcanizable elastomer is simultaneously crosslinked and dispersed as fine particles of a "micro gel" within the engineering resin matrix.

Dynamic vulcanization is effected by mixing the ingredients at a temperature which is at or above the curing temperature of the elastomer in equipment such as roll mills, Banbury RTM mixers, continuous mixers, kneaders or mixing extruders, e.g., twin screw extruders. The unique characteristic of the dynamically cured compositions is that, notwithstanding the fact that the elastomer component can be fully cured, the compositions can be processed and reprocessed by conventional rubber processing techniques such as extrusion, injection molding, compression molding, etc. Scrap or flashing can be salvaged and reprocessed.

Particularly preferred thermoplastic polymers useful in DVA's include engineering resins selected from the group consisting of polyamides, polycarbonates, polyesters, polysulfones, polylactones, polyacetals, acrylonitrile-butadiene-styrene resins (ABS), polyphenyleneoxide (PPO), polyphenylene sulfide (PPS), styrene-acrylonitrile resins (SAN), polyimides, styrene maleic anhydride (SMA), aromatic polyketones (PEEK, PEK, and PEKK) and mixtures thereof. Preferred engineering resins are polyamides. The more preferred polyamides are nylon 6 and nylon 11. Preferably the engineering resin(s) may suitably be present in an amount ranging from about 10 to 98 weight percent, preferably from about 20 to 95 weight percent, the elastomer can be present in an amount ranging from about 2 to 90 weight percent, preferably from about 5 to 80 weight percent, based on the polymer blend. Preferably the elastomer is present in said composition as particles dispersed in said engineering resin.

The elastomer composition can include up to 49 wt % thermoplastic resin. In one or more embodiments, the elastomer composition can contain of from 0.5 to 45 wt % thermoplastic resin. In one or more embodiments, the elastomer composition can contain of from 2 to 35 wt % thermoplastic resin. In one or more embodiments, the elastomer composition can contain of from 5 to 30 wt % thermoplastic resin. In one or more embodiments, the elastomer composition can contain of from 10 to 25 wt % thermoplastic resin.

Graphite/Graphene

The elastomer composition typically includes nanoparticles of graphite (preferably graphene), typically present at from 0.1 to 20 phr. The term "nanoparticles" as used herein refers to particles or molecules less than 100 nanometers in size (i.e. at least one dimension (length, width or thickness) is less than 100 nanometers). Alternately two dimensions are (length, width or thickness) are less than 100 nanometers, alternately all three dimensions (length, width and thickness) are less than 100 nanometers. In a preferred embodiment the nanoparticle is a sheet having a thickness of less than 100 nanometers and a length and or width that is at least 10 times greater than the thickness (preferably 20 to 500 times, preferably 30 to 500 times the thickness).

The graphite is preferably in the form of one or more exfoliated graphitic layers (also referred to as expanded graphite). The exfoliated graphitic layers can be produced using the Hummers method. ("*Graphene-based composite materials*," Stankovich, Sasha; Dikin, Dmitriy A.; Dommett, Geoffrey H. B.; Kohlhaas, Kevin M.; Zimney, Eric J.; Stach, Erie A.; Piner, Richard D.; Nguyen, SonBinh T.; Ruoff, Rodney S.; Nature, 2006, 442, 282-286). The graphite treated in this manner can have one or more hydroxyl, epoxide, carbonyl, and/or carboxyl functional groups located on the graphite sheets. These groups can be used to react with functional groups on the elastomer backbone. The groups can also be used to render the sheets less hydrophilic by reaction with non-polymeric hydrocarbon containing reactants. Examples of useful reactive groups include isocyanates, amines, carboxylic acid, benzyl halide, hydroxyl, and others.

The exfoliated graphitic layers can be produced using a method described by Robert Prud'homme at Princeton University ("*Functionalized Single Graphene Sheets Derived from Splitting Graphite Oxide*"; Hannes C. Schniepp, JeLuen Li, Michael J. McAllister, Hiroaki Sal, Margarita Herrera-Alonso, Douglas H. Adamson, Robert K. Prud'homme, Roberto Car, Dudley A. Saville, and Ilhan A. Aksay, *J. Physical Chemistry—B* 2006, 110, 8535-8539; "*Oxygen-Driven Unzipping of Graphitic Materials*", Je-Luen Li, Konstantin N. Kudin, Michael J. McAllister, Robert K. Prud'homme, Ilhan A. Aksay, and Roberto Car, *Physical Review Letters* 2006, 96, 17601). This is essentially a two-step process. First, graphite is converted to graphite oxide by putting it into an oxidizing solution of sulfuric acid, nitric acid, and potassium chlorate for over four days. This puts oxygen moieties of various types (epoxy, carboxyl, etc.) onto the graphite sheets and this opens the spacing between them. In the second step the graphite oxide is heated rapidly to 1050° C. This converts nearly all of the oxygen sites to $CO_2$, and the evolution of this gas splits the material into individual sheets. These sheets still contain a small amount of oxygen, and are very corrugated so that they remain separate under further processing. In blending with polymers, they exhibit effective aspect ratios of several hundred. With this morphology, and with good compatibility with hydrocarbon polymers like PIB and Exxpro™ elastomers, the addition of as little as 5 parts of exfoliated graphene can significantly reduce permeability by a factor between 3 and 5.

In another embodiment, the graphite useful herein is an expanded graphite. Expanded graphite can typically be made by immersing natural flake graphite in a bath of acid (such as sulphuric acid, nitric acid, and acetic acid, combinations thereof, or the combination of chromic acid, then concentrated sulfuric acid), which forces the crystal lattice planes apart, thus expanding the graphite.

Preferably, the nanocomposite contains 0.01 to 10.0 phr graphite (preferably graphene) nanoparticles. In one or more embodiments, the amount of graphite (preferably graphene) nanoparticles ranges from about 0.05 phr to about 5.0 phr. In one or more embodiments, the amount of graphite (preferably graphene) nanoparticles ranges from about 0.1 phr to about 5.0 phr; from about 0.5 phr to about 5.0 phr; from about 1.0 phr to about 5.0 phr. In one or more embodiments, the amount of graphite (preferably graphene) nanoparticles ranges from a low of about 0.05 phr, 0.5 phr or 1.2 phr to a high of about 3.5 phr, 4.5 phr or 5.0 phr.

In other preferred embodiments the graphite has a shape that is needle-like or plate-like, with an aspect ratio greater than 1.2 (preferably greater than 2, preferably greater than 3, preferably greater than 5, preferably greater than 10, preferably from 2 to 20, preferably from 3-10), where the aspect ratio is the ratio of the longest dimension to the shortest dimension (length, width and thickness) of the particles, on average. In other embodiments the graphite has an aspect ratio of essentially 1 (0.9 to 1.1); i.e., it is not needle-like or spherical but is essentially plate-like. In another embodiment, the graphite is pulverized. Useful graphites may have a specific surface area of 10 to 300 $m^2/cm^3$.

In some embodiments, the graphite (preferably graphene) has up to 50 wt % present in the beta form, typically form 5 to 30 wt %. In other embodiments, the graphite (preferably graphene) are present in the alpha form, having typically less than 1 wt % beta form, preferably 0 wt % beta form.

In a preferred embodiment, the expandable graphite may have one or more of the following properties (before expansion): a) particle size of 32 to 200 mesh, (alternately a median particle diameter of 0.1 to 500 microns (alternately 0.5 to 350 microns, alternately 1 to 100 microns)), and/or b) expansion ratio of up to 350 cc/g, and/or c) a pH of 2 to 11, (preferably 4 to 7.5, preferably 6 to 7.5). Expandable graphite can be purchased from GRAFTech International or Asbury Carbons, Anthracite Industries, among others. Particularly useful expandable graphite includes GRAFGUARD™ Expandable Graphite Flakes and the expandable graphite described in U.S. Pat. No. 3,404,061; U.S. Pat. No. 4,895,713; U.S. Pat. No. 5,176,863; U.S. Pat. No. 5,443,894; U.S. Pat. No. 6,460, 310; U.S. Pat. No. 6,669,919). Asbury Carbons Expanded Graphite grades 3721, 1721, 3393, 3772, 3577, 1395, 3626, 3494, 3570, and 3538 are also useful herein.

In a preferred embodiment the expandable graphite has an onset temperature (temperature at which it begins to expand) of at 160° C. or more, alternately 200° C. or more, alternately 400° C. or more, alternately 600° C. or more, alternately 750° C. or more, alternately 1000° C. or more. Preferably the expandable graphite has an expansion ratio of at least 50:1 cc/g, preferably at least 100:1 cc/g, preferably at least 200:1 cc/g, preferably at least 250:1 cc/g at 600° C. In another embodiment, the expandable graphite has an expansion ratio of at least 50:1 cc/g, preferably at least 100:1 cc/g, preferably at least 200:1 cc/g, preferably at least 250:1 cc/g at 150° C. The graphite may be expanded before it is combined with the other blend components or it may be expanded while blending with other blend components. In some embodiments, the graphite is not expanded (or expandable) after formation into the an article (such as an air barrier, or a tire innerliner).

In a preferred embodiment the graphite is or comprises graphene. Graphene is a one-atom-thick planar sheet of $sp^2$-bonded carbon atoms that are densely packed in a honeycomb crystal lattice. The carbon-carbon bond length in graphene is approximately 1.42 angstroms. Graphene is the basic structural element of graphitic materials including graphite, as graphite can be considered to be many layers of graphene. Graphene can be prepared by micromechanical cleavage of graphite (e.g. removing flakes of graphene from graphite) or by exfoliation of intercalated graphitic compounds. Likewise, graphene fragments can be prepared through chemical modification of graphite. First, microcrystalline graphite is treated with a strongly acidic mixture of sulfuric acid and nitric acid. Then the material is oxidized and exfoliated resulting in small graphene plates with carboxyl groups at their edges. These are converted to acid chloride groups by treatment with thionyl chloride; next, they are converted to the corresponding graphene amide via treatment with octadecylamine. The resulting material (circular graphene layers of 5.3 angstrom thickness) is soluble in tetrahydrofuran, tetrachloromethane, and dichloroethane. (see Niyogi, et al. *Solution Properties of Graphite and Graphene. J. Am. Chem. Soc.* 128(24) pp. 7720-7721 (2006).)

In another embodiment, the graphite is present in the elastomer composition as dispersed nanosheets having a thickness of less than 100 nanometers, preferably less than 50 nanometers, preferably less than 20 nanometers.

Processing Aids

In one or more embodiments, the elastomer composition can include one or more processing aids. Suitable processing aids can include, but are not limited to, plasticizers, tackifiers, extenders, chemical conditioners, homogenizing agents and peptizers such as mercaptans, petroleum and vulcanized vegetable oils, mineral oils, paraffinic oils, polybutene oils, naphthenic oils, aromatic oils, waxes, resins, rosins, or other synthetic fluids having a lower pour point, lower emission, etc., compared to paraffinic or mineral oil and the like. Some commercial examples of processing aids are SUNDEX™ (Sun Chemicals), a naphthenic processing oil, PARAPOL™ (ExxonMobil Chemical Company), a polybutene processing oil having a number average molecular weight of from 800 to 3000, and FLEXON™ (ExxonMobil Chemical Company), a paraffinic petroleum oil.

Preferred plasticizers include polyalphaolefins (PAOs), high purity hydrocarbon fluid compositions (HPFCs) and Group III basestocks such as those described in WO 2004/014998. Preferred PAOs include oligomers of decene and co-oligomers of decene and dodecene. Preferred PAOs are available under the trade name SuperSyn™ and SpectraSyn™ PAO from ExxonMobil Chemical Company, in Houston Tex.

Suitable polybutene oils have an Mn of less than 15,000 g/mol. Preferred polybutene oils also include homopolymer or copolymer of olefin derived units having from 3 to 8 carbon atoms, preferably from 4 to 6 carbon atoms. In yet another embodiment, the polybutene is a homopolymer or copolymer of a $C_4$ raffinate. An embodiment of preferred low molecular weight polymers termed "polybutene" polymers is described in, for example, Synthetic Lubricants and High-Performance Functional Fluids 357-392 (Leslie R. Rudnick & Ronald L. Shubkin, ed., Marcel Dekker 1999) (hereinafter "polybutene processing oil" or "polybutene").

In one or more embodiments, the polybutene oil can be a copolymer comprising at least isobutylene derived units, and optionally 1-butene derived units, and/or 2-butene derived units. In one or more embodiments, the polybutene is a homopolymer if isobutylene, or a copolymer of isobutylene and 1-butene or 2-butene, or a terpolymer of isobutylene and 1-butene and 2-butene, wherein the isobutylene derived units are from 40 to 100 wt % of the copolymer, the 1-butene derived units are from 0 to 40 wt % of the copolymer, and the 2-butene derived units are from 0 to 40 wt % of the copolymer. In one or more embodiments, the polybutene is a copolymer or terpolymer wherein the isobutylene derived units are from 40 to 99 wt % of the copolymer, the 1-butene derived units are from 2 to 40 wt % of the copolymer, and the 2-butene derived units are from 0 to 30 wt % of the copolymer. In yet another embodiment, the polybutene is a terpolymer of the three units, wherein the isobutylene derived units are from 40 to 96 wt % of the copolymer, the 1-butene derived units are from 2 to 40 wt % of the copolymer, and the 2-butene derived units are from 2 to 20 wt % of the copolymer. In yet another embodiment, the polybutene is a homopolymer or copolymer of isobutylene and 1-butene, wherein the isobutylene derived units are from 65 to 100 wt % of the homopolymer or copolymer, and the 1-butene derived units are from 0 to 35 wt % of the copolymer.

Polybutene processing oils typically have a number average molecular weight (Mn) of less than 10,000 g/mol, less than 8000 g/mol, or less than 6000 g/mol. In one or more embodiments, the polybutene oil has a number average molecular weight of greater than 400 g/mol, and greater than 700 g/mol, or greater than 900 g/mol. A preferred embodiment can be a combination of any lower limit with any upper limit herein. For example, in one or more embodiments of the polybutene described, the polybutene has a number average molecular weight of from 400 g/mol to 10,000 g/mol, and from 700 g/mol to 8000 g/mol. Useful viscosities of the polybutene processing oil ranges from 10 to 6000 cSt (centistokes) at 100° C., or from 35 to 5000 cSt at 100° C., or is greater than 35 cSt at 100° C., or is greater than 100 cSt at 100° C.

Commercial examples of polybutene oils include the PARAPOL™ Series of processing oils (ExxonMobil Chemical Company, Houston Tex.), such as PARAPOL™ 450, 700, 950, 1300, 2400 and 2500. The commercially available PARAPOL™ Series of polybutene processing oils are synthetic liquid polybutenes, each individual formulation having a certain molecular weight, all formulations of which can be used in the composition described. The molecular weights of the PARAPOL™ oils are from 420 g/mol Mn (PARAPOL™ 450) to 2700 g/mol Mn (PARAPOL™ 2500) as determined by gel permeation chromatography. The MWD of the PARAPOL™ oils range from 1.8 to 3 or from 2 to 2.8. Table 1 shows some of the properties of the PARAPOL™ oils useful in embodiments, wherein the viscosity was determined as per ASTM D445-97, and the molecular weight by gel permeation chromatography.

TABLE 1

Properties of Individual PARAPOL ™ Grades of Polybutene

| Grade | Mn (g/mol) | Viscosity @ 100° C., cSt |
| --- | --- | --- |
| 450 | 420 | 10.6 |
| 700 | 700 | 78 |
| 950 | 950 | 230 |
| 1300 | 1300 | 630 |
| 2400 | 2350 | 3200 |
| 2500 | 2700 | 4400 |

Other properties of PARAPOL™ processing oils are as follows: the density (g/mL) of PARAPOL™ processing oils varies from about 0.85 (PARAPOL™ 450) to 0.91 (PARAPOL™ 2500). The bromine number (CG/G) for PARAPOL™ oils ranges from 40 for the 450 Mn processing oil, to 8 for the 2700 Mn processing oil.

The elastomeric composition can include one or more types of polybutene as a mixture, blended either prior to addition to the elastomer, or with the elastomer. The amount and identity (e.g., viscosity, Mn, etc.) of the polybutene processing oil mixture can be varied in this manner. Thus, PARAPOL™ 450 can be used when low viscosity is desired in the composition described, while PARAPOL™ 2500 can be used when a higher viscosity is desired, or compositions thereof to achieve some other viscosity or molecular weight.

In this manner, the physical properties of the composition can be controlled. More particularly, the phrases "polybutene processing oil", or "polybutene processing oils" include a single oil or a composition of two or more oils used to obtain any viscosity or molecular weight (or other property) desired, as specified in the ranges disclosed herein.

The processing oil or oils can be present in the elastomeric composition described from 1 to 70 phr; or from 2 to 60 phr; or from 4 to 35 phr; or from 5 to 30 phr. The processing oil or oils can be present in the elastomeric composition described from 1 to 70 phr in one embodiment, from 3 to 60 phr in another embodiment, and from 5 to 50 phr in yet another embodiment.

Fillers

The elastomeric composition can include one or more fillers such as calcium carbonate, clay, mica, silica and silicates, talc, titanium dioxide, starch, and other organic fillers such as wood flour, and carbon black. The filler components are typically present at a level of from 10 to 200 phr of the composition, more preferably from 40 to 140 phr. In some embodiments, two or more carbon blacks are used in combination for example Regal 85 is a carbon black that has multiple particle sizes, rather than just one. Combinations also include those where the carbon blacks have different surface areas. Likewise, two different blacks which have been treated differently may also be used. For example a carbon black that has been chemically treated can be combined with a carbon black that has not. The carbon black no having a surface area of less than 30 $m^2/g$ and/or not a dibutylphthalate oil absorption of less than 80 $cm^3/100$ gm may typically be present at a level of from 0 to 200 phr, preferably 10 to 200 phr, preferably 20 to 180 phr, more preferably 30 to 160 phr, and more preferably 40 to 140 phr.

In one or more embodiments, the elastomeric composition can include one or more exfoliated clays. Exfoliated clays, also referred to as "nanoclays," are well known, and their identity, methods of preparation and blending with polymers is disclosed in, for example, JP 2000109635, 2000109605, 11310643; DE 19726278; WO98/53000; U.S. Pat. Nos. 5,091,462, 4,431,755, 4,472,538, and 5,910,523. Swellable layered clay materials can include natural or synthetic phyllosilicates, particularly smectic clays such as montmorillonite, nontronite, beidellite, volkonskoite, laponite, hectorite, saponite, sauconite, magadiite, kenyaite, stevensite and the like, as well as vermiculite, halloysite, aluminate oxides, hydrotalcite and the like. These layered clays generally comprise particles containing a plurality of silicate platelets having a thickness of from 4-20 Å or 8-12 Å, bound together and contain exchangeable cations such as $Na^+$, $Ca^{+2}$, $K^+$ or $Mg^{+2}$ present at the interlayer surfaces.

The layered clay can be intercalated and exfoliated by treatment with organic molecules (swelling agents) capable of undergoing ion exchange reactions with the cations present at the interlayer surfaces of the layered silicate. Suitable swelling agents include cationic surfactants such as ammonium, alkylamines or alkylammonium (primary, secondary, tertiary and quaternary), phosphonium or sulfonium derivatives of aliphatic, aromatic or arylaliphatic amines, phosphines and sulfides. Desirable amine compounds (or the corresponding ammonium ion) are those with the structure $R_1R_2R_3N$, wherein $R_1$, $R_2$, and $R_3$ are $C_1$ to $C_{20}$ alkyls or alkenes which can be the same or different. In one or more embodiments, the exfoliating agent is a so called long chain tertiary amine, wherein at least $R_1$ is a $C_{14}$ to $C_{20}$ alkyl or alkene.

Another class of swelling agents includes those which can be covalently bonded to the interlayer surfaces. These include polysilanes of the structure $—Si(R')_2R^2$ where R' is the same or different at each occurrence and is selected from alkyl, alkoxy or oxysilane and $R^2$ is an organic radical compatible with the matrix polymer of the composite.

Other suitable swelling agents include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. Nos. 4,472,538, 4,810,734, 4,889,885 as well as WO92/02582.

Clay or exfoliated clay can be incorporated in the nanocomposites in an amount sufficient to develop an improvement in the mechanical properties or barrier properties of the nanocomposite, e.g., tensile strength or air/oxygen permeability. Amounts generally will range from 0.5 to 15 wt %; or from 1 to 10 wt %; or from 1 to 5 wt %, based on the polymer content of the nanocomposite. Expressed in parts per hundred rubber, the clay or exfoliated clay can be present from 1 to 30 phr; or from 3 to 20 phr. In one or more embodiments, the exfoliated clay is an alkylamine-exfoliated clay.

Carbon Black

Carbon black can be produced by the incomplete combustion of organic substances. There are two main production processes for the manufacture of carbon black: the oil furnace process and the thermal process. In the furnace process a fuel is burned in an excess of air to produce finely divided carbon. There are several distinct production segments: reaction; filtration and separation; pelletizing; and drying. The thermal process is similar, but is a continuous furnace process. The American Society of Testing Materials (ASTM) has established a carbon black classification system based on particle size and surface oxidation, ASTM D1765. The degree of surface oxidation affects the cure time of carbon-black filled rubber compounds. The "N" denotes normal curing blacks and the "S" refers to slow curing blacks. After N or S, the first number of the three-digit suffix identifies the particle size and the remaining two digits are assigned arbitrarily.

Carbon black owes its reinforcing character in rubber to the size, shape and surface chemistry of the aggregate structures which consists of primary particles essentially spherical in shape that are chemically bonded to one another. The two most important properties of carbon black are surface area and structure. Surface area depends inversely upon the size of the primary particles, and is one measure of the area available for physical interaction with the polymer. Surface area ranges from 10-140 $m^2/g$ with thermal blacks having the lowest values based on nitrogen adsorption ($N_2SA$) via ASTM D4820. Surface area is also measured by cetyl trimethylammonium bromide (CTAB) absorption. The structure of carbon black depends upon the size and grouping of these primary particles in the aggregate. The more primary particles in the aggregate, the higher structure of the carbon black due to the more complex shape and void volume (porosity). Structure varies from 35-130 $cm^3/100$ gm as measured by dibutylphthalate (DBP) oil absorption via ASTM D2414. Useful grades of carbon black as described in Rubber Technology 59-85 (1995) range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires are N330, N351, N550, N650, N660, and N762. Embodiments of the carbon black useful in, for example, innerliners or innertubes are N550, N650, N660, N762, N990, and the like.

The compositions can include carbon black having a surface area of less than 30 $m^2/g$ and a dibutylphthalate oil absorption of less than 80 cm³/100 gm. Carbon blacks can include, but are not limited to N762, N774, N907, N990, Regal 85, and Regal 90. Table 2 shows properties of useful carbon blacks.

TABLE 2

Properties of Individual Carbon Black Grades

| Grade | N2SA, m2/gm | DBP Absorption, cm3/100 gm |
|---|---|---|
| N660 | 34 | 90 |
| N754 | 25 | 58 |
| N762 | 26 | 64 |
| N774 | 28 | 70 |
| N787 | 30 | 80 |
| N907 | 10 | 38 |
| N990 | 7 | 42 |
| N991 | 10 | 38 |
| Regal 85 | 23 | 33 |
| Regal 90 | 23 | 32 |
| ARO 60 | 23 | 58 |
| SL 90 | 25 | 58 |

The carbon black having a surface area of less than 30 m²/g and a dibutylphthalate oil absorption of less than 80 cm³/100 gm is typically present at a level of from 10 to 200 phr, preferably 20 to 180 phr, more preferably 30 to 160 phr, and more preferably 40 to 140 phr.

Curing Agents and Accelerators

The elastomer composition can include one or more other components and additives customarily used in rubber mixes, such as pigments, accelerators, cross-linking and curing materials, antioxidants, antiozonants, and fillers. In one or more embodiments, processing aids (resins) such as naphthenic, aromatic or paraffinic extender oils can be present from 1 to 30 phr. In one or more embodiments, naphthenic, aliphatic, paraffinic and other aromatic resins and oils are substantially absent from the composition. By "substantially absent", it is meant that naphthenic, aliphatic, paraffinic and other aromatic resins are present, if at all, to an extent no greater than 2 phr in the composition.

Generally, polymer compositions, e.g., those used to produce tires, are crosslinked. It is known that the physical properties, performance characteristics, and durability of vulcanized rubber compounds are directly related to the number (crosslink density) and type of crosslinks formed during the vulcanization reaction. (See, e.g., Helt et al., *The Post Vulcanization Stabilization for NR*, Rubber World 18-23 (1991). Cross-linking and curing agents include sulfur, zinc oxide, and fatty acids. Peroxide cure systems may also be used. Generally, polymer compositions can be crosslinked by adding curative molecules, for example sulfur, metal oxides (i.e., zinc oxide), organometallic compounds, radical initiators, etc. followed by heating. In particular, the following are common curatives that will function in the present invention: ZnO, CaO, MgO, $Al_2O_3$, $CrO_3$, FeO, $Fe_2O_3$, and NiO. These metal oxides can be used in conjunction with the corresponding metal stearate complex (e.g., $Zn(Stearate)_2$, $Ca(Stearate)_2$, $Mg(Stearate)_2$, and $Al(Stearate)_3$), or with stearic acid, and either a sulfur compound or an alkylperoxide compound. (See also, *Formulation Design and Curing Characteristics of NBR Mixes for Seals*, Rubber World 25-30 (1993). This method can be accelerated and is often used for the vulcanization of elastomer compositions.

Accelerators include amines, guanidines, thioureas, thiazoles, thiurams, sulfenamides, sulfenimides, thiocarbamates, xanthates, and the like. Acceleration of the cure process can be accomplished by adding to the composition an amount of the accelerant. The mechanism for accelerated vulcanization of natural rubber involves complex interactions between the curative, accelerator, activators and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), 2,2'-benzothiazyl disulfide (MBTS), hexamethylene-1,6-bisthiosulfate disodium salt dihydrate, 2-(morpholinothio) benzothiazole (MBS or MOR), compositions of 90% MOR and 10% MBTS (MOR 90), N-tertiarybutyl-2-benzothiazole sulfenamide (TBBS), and N-oxydiethylene thiocarbamyl-N-oxydiethylene sulfonamide (OTOS), zinc 2-ethyl hexanoate (ZEH), N,N'-diethyl thiourea.

In one or more embodiments described, at least one curing agent is present from 0.2 to 15 phr, or from 0.5 to 10 phr. Curing agents include those components described above that facilitate or influence the cure of elastomers, such as metals, accelerators, sulfur, peroxides, and other agents common in the art, and as described above.

Processing

Mixing of the components can be carried out by combining the components in any suitable mixing device such as a Banbury™ mixer, Brabender™ mixer or preferably a mixer/extruder. Mixing can be performed at temperatures up to the melting point of the elastomer and/or rubber used in the composition at a rate sufficient to allow the graphite and/or clay to exfoliate and become uniformly dispersed within the polymer to form the nanocomposite.

Suitable mixing rates can range from about 60 RPM to about 8,500 RPM. In one or more embodiments, the mixing rate can range from a low of about 60 RPM, 100 RPM, or 300 RPM to a high of about 500 RPM, 2,500 RPM, or 8,000 RPM. In one or more embodiments, the mixing rate can range from a low of about 500 RPM, 1,000 RPM, or 2,500 RPM to a high of about 5,500 RPM, 6,500 RPM, or 8,000 RPM. In one or more embodiments, the mixing rate can range from a low of about 100 RPM, 750 RPM, or 1,500 RPM to a high of about 6,500 RPM, 7,500 RPM, or 8,500 RPM. In one or more embodiments, the mixing rate can range from a low of about 5,000 RPM, 5,700 RPM, or 6,000 RPM to a high of about 7,000 RPM, 7,500 RPM, or 7,700 RPM.

In one or more embodiments, the mixing temperature can range from about 40° C. to about 340° C. In one or more embodiments, the mixing temperature can range from about 80° C. to 300° C. In one or more embodiments, the mixing temperature can range from a low of about 30° C., 40° C., or 50° C. to a high of about 70° C., 170° C., or 340° C. In one or more embodiments, the mixing temperature can range from a low of about 80° C., 90° C., or 100° C. to a high of about 120° C., 250° C., or 340° C. In one or more embodiments, the mixing temperature can range from a low of about 85° C., 100° C., or 115° C. to a high of about 270° C., 300° C., or 340° C.

In at least one specific embodiment, 70% to 100% of the one or more elastomers can be mixed at a rate noted above for 20 to 90 seconds, or until the temperature reaches from 40° C. to 60° C. Then, ¾ of the filler, and the remaining amount of elastomer, if any, can be added to the mixer, and mixing can continue until the temperature reaches from 90° C. to 150° C. Next, any remaining filler can be added, as well as processing oil, and mixing can continue until the temperature reaches from 140° C. to 190° C. The finished mixture can then be finished by sheeting on an open mill and allowed to cool to from 60° C. to 100° C. when the curatives are added.

The composition described herein may be incorporated into articles, such as films, sheets, molded parts and the like. Specifically the composition described herein may be formed into tires, tires parts (such as sidewalls, treads, tread cap, innertubes, innerliners, apex, chafer, wirecoat, and ply coat), tubes, pipes or any other application where air impermeability would be advantageous.

In a preferred embodiment articles formed from the elastomeric compositions described herein have a permeability of 105 mm-cc/M$^2$-day or less, preferably 100 mm-cc/M$^2$-day or less, preferably 95 mm-cc/M$^2$-day or less, preferably 90 mm-cc/M$^2$-day or less, preferably 85 mm-cc/M$^2$-day or less, preferably 80 mm-cc/M$^2$-day or less, as determined on a MOCON OX-TRAN 2/61 permeability tester at 40° C. as described below.

In another embodiment, this invention relates to:
1. An elastomeric composition, comprising:
   from 0.1 to 20 phr graphite nanoparticles (preferably graphene nanoparticles);
   from 1 to 99 wt % of at least one elastomer component comprising a random copolymer having at least one $C_4$ to $C_7$ isomonoolefin derived unit; and
   10 to 200 phr of at least one filler that is not graphite.
2. The composition of paragraph 1, wherein the random copolymer is selected from the group consisting of a halogenated poly(isobutylene-co-p-methylstyrene), halogenated star-branched butyl rubber, halogenated butyl rubber, and mixtures thereof.
3. The composition of paragraph 1 or 2, further comprising a thermoplastic resin.
4. The composition of paragraph 1, 2 or 3, further comprising a polybutene oil having a number average molecular weight greater than 400 g/mol and less than 10,000 g/mol.
5. The composition of paragraph 4, wherein the polybutene is present from 2 to 40 phr.
6. The composition of paragraph 1, 2, 3, 4 or 5, wherein the filler is selected from the group consisting of calcium carbonate, clay, mica, silica, silicates, talc, titanium dioxide, starch, wood flour, carbon black, and mixtures thereof.
7. The composition of paragraph 1, 2, 3, 4, 5 or 6 further comprising an exfoliated clay selected from the group consisting of exfoliated natural or synthetic montmorillonite, nontronite, beidellite, volkonskoite, laponite, hectorite, saponite, sauconite, magadiite, kenyaite, stevensite, vermiculite, halloysite, aluminate oxides, hydrotalcite, and mixtures thereof.
8. An innerliner for a tire comprising the composition of paragraph 1, 2, 3, 4, 5, 6 or 7.
9. The composition of paragraph 1, 2, 3, 4, 5, 6, 7 or 8 where the nanoparticles are graphene nanoparticles present at up to 5 phr and the elastomer component consists essentially of poly(isoolefin-co-p-methylstyrene).
10. The composition of paragraph 9, wherein the poly(isoolefin-co-p-methylstyrene) is a halogenated poly(isobutylene-co-p-methylstyrene).
11. The composition of paragraph 10, wherein the halogenated poly(isobutylene-co-p-methylstyrene) has a p-bromomethylstyrene content of from 0.1 to 10 wt % based on the weight of the copolymer.
12. The composition of any of paragraphs 1 to 11, further comprising a secondary elastomer component (different from the first elastomer component) selected from the group consisting of natural rubbers, polyisoprene rubber, styrene butadiene rubber (SBR), polybutadiene rubber, isoprene butadiene rubber (IBR), styrene-isoprene-butadiene rubber (SIBR), ethylene-propylene rubber, ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl(polyisobutylene/isoprene copolymer) rubber; isobutylene/methylstyrene copolymers such as isobutylene/meta-bromomethylstyrene, isobutylene/bromomethylstyrene, isobutylene/chloromethylstyrene, halogenated isobutylene cyclopentadiene, and isobutylene/chloromethylstyrene and mixtures thereof.
13. An innerliner for a tire comprising the composition of any of paragraphs 1 to 12.
14. The composition of any of paragraphs 1 to 13 wherein the elastomer is combined with a thermoplastic resin to form a dynamically vulcanized alloy.
15. A method for making an elastomeric composition, comprising:
   mixing one or more nanoparticles comprising graphite into at least one elastomer component comprising a random copolymer of poly(isoolefin-co-p-methylstyrene) and at least one filler,
   wherein the mixing step occurs at a rate sufficient to disperse the nanoparticles within the elastomer.
16. A method for making an article, comprising:
   a) heating expandable graphite to obtain nanoparticles;
   b) mixing one or more graphene nanoparticles with filler and an elastomer component comprising a random copolymer of isobutylene;
   c) forming the mixture into an article;
   wherein the mixing step occurs at a rate sufficient to disperse the nanoparticles within the elastomer, and wherein the graphite does not further expanded if the article is exposed to a temperature of 0 to 1000° C.
17. The method of paragraph 15 or 16 further comprising obtaining the nanoparticles by heating expandable graphite during mixing with the elastomer.
18. The method of paragraph 15, 16, or 17 further comprising obtaining the nanoparticles by heating expandable graphite prior to mixing with the elastomer.

EXAMPLES

The foregoing discussion can be further described with reference to the following non-limiting examples. In accordance with one or more embodiments described, the following examples are provided to illustrate significantly improved oxygen retention properties with improved processability of certain elastomeric compositions suitable for use as tire innerliners.

Expansion of Graphite

Expandable graphite (about 1 g) was transferred into a crucible and placed in a preheated furnace (about 700° C.) for 2 minutes to expand. The heated graphite was ten transferred to a 1 L beaker which was kept under a vacuum oven at 100° C. until further use. The graphite was GRAFGUARD® Expandable Graphite Flakes (GRAFTech) 160-50N (reported expansion volume at 600° C. of 250 cc/g) or Asbury Carbons Expandable Graphite 3772 (reported expansion ratio 300:1).

Preparation of Samples

Five samples (samples 1-5) were prepared by melt mixing. To prepare the samples, a BRABENDER® mixer was preheated to 130° C. at 60 RPM, then 36 grams of the elastomer component (brominated poly(isobutylene-co-p-methylstyrene) having 10 wt % p-methylstyrene units, 0.85 mol % benzylic bromine functionality, and Mooney Viscosity of 32+/−1, (hereinafter "Elastomer A")) was put into the mixer. Similar BIMSM elastomers are commercially available as Exxpro™ elastomers from ExxonMobil Chemical Company. As soon as the elastomer was flowing, the noted amount (see Table 1) of expanded graphite ($X_{EG}$) was added. After one minute of mixing, the graphite-based nanocomposite was mixed at 130° C.-145° C. with 60 phr carbon black (N660) for 7 minutes. The mixture was then mixed with the curatives package (1.0 phr stearic acid, 1.0 phr Kadox 911 ZnO, and 1.0 phr 2-mercaptobenzothiazole disulfide ("MBTS") from R. T. Vanderbilt (Norwalk, Conn.) at 40° C. and 40 RPM for 3 minutes.

The resulting rubber compound was milled, compression molded and cured. Cure properties were measured using an ODR 2000 at 170° C. and 3 degree arc. Test specimens were cured at 170° C., for a time corresponding to $T_c$90+appropriate mold lag.

Each sample was compression molded with slow cooling to provide defect-free pads. A compression and curing press was used for rubber samples. Typical thickness of a compression molded pad was around 0.3 mm (15 mil). Using an Arbor press, 5 cm (2-in.) diameter disks were punched out from molded pads for permeability testing. These disks were conditioned in a vacuum oven at 60° C. overnight prior to the measurement. The disks were tested for oxygen permeation measurements using a MOCON OX-TRAN 2/61 permeability tester at 40° C. with nitrogen on one side of the disk at 0.07 MPa(g) (10 psig) and 0.07 MPa(g) (10 psig) oxygen on the other. The time required for oxygen to permeate through the disk, or for oxygen concentration on the nitrogen side to reach a constant value, was recorded and used to determine the oxygen permeability. Where two samples were prepared using the same procedure, the average permeation rate results were obtained from two measurements and are given in the Tables below.

TABLE 1 melt mixing

| Sample | $X_{EG}$ (phr) | Oxygen Permeation Rate (cc-mm/m²-day) | |
|---|---|---|---|
| | | GRAFTech | Asbury |
| 1 | 0.0 | 120.0 | 120.0 |
| 2 | 0.5 | 102.8 | 94.6 |
| 3 | 1.0 | 92.0 | 94.2 |
| 4 | 1.5 | 100.1 | 94.2 |
| 5 | 2.0 | 97.0 | 95.0 |

FIG. 1 graphically illustrates the oxygen permeation rate versus amounts of graphene, as summarized in Table 1. As shown in Table 1 and depicted in FIG. 1, the presence of graphene provided a significant increase in oxygen retention (about 20%). Higher graphene loadings appeared to make little difference, and the type of graphene showed a similar effect. Not wishing to be bound by theory, it is believed that the Asbury material expanded better. This is shown by the physical appearance of the material after expansion and the behavior of the permeation rate with the increasing amount of filler. The expandable graphite provided by GRAFTech was in a highly agglomerated state after expansion, while the material provided by Asbury was in a loose agglomerated state. This suggests that the Asbury material expanded better. It is believed that the degree of expansion provides better dispersion of the graphite/graphene material within the nanocomposite and thus, improves oxygen and air retention.

Five samples (6-10) were also prepared by solution mixing using various solvents. To prepare the samples, the 50 grams of Elastomer A was put in a 500 mL jar and a solvent, either hexane, THF, 50/50 mix hexane/THF, ethyl acetate, or 50/50 mix hexane/ethyl acetate, (300 mL) was poured into the jar to dissolve the polymer. To accelerate dissolution of the polymer in the selected solvent the jar containing the polymer and the solvent was put overnight on a horizontal shaker at a slow shaking cycle. The expanded graphite (0.50 g, 1.0 phr, Asbury) was added to 700 mL of the selected solvent. The suspension was sonicated for 24 hours. Then, the polymer solution and graphene suspension were thoroughly mixed in a 2 L beaker. Excess isopropanol was added to precipitate the Elastomer A/graphene mixture. The precipitate was filtered, allowed to dry at room temperature, and then put into a vacuum oven at 80° C. overnight. Finally, the Elastomer A/graphene mixture (36.0 g) was mixed with 60 phr carbon black, 1.0 phr MBTS, 1.0 phr $ZnO_2$, and 1.0 phr stearic acid. The absolute oxygen permeability obtained from these samples is summarized in Table 2 below.

TABLE 2

Solution Mixing at 1.0 phr of expanded graphene

| Sample | Solvent | Oxygen Permeability (cc-mm/m²-day) |
|---|---|---|
| 1 | Hexane | 102.5 |
| 2 | THF | 98.3 |
| 3 | 50/50 mix hexane/THF | 102.2 |
| 4 | Ethyl acetate | 96.6 |
| 5 | Hexane/ethyl acetate | 94.5 |

As shown in Table 2, the various solvents provided permeation rates within about ±5% of one another. Although it was observed that permeation rates were similar, additional information was obtained about the solubility of Elastomer A and the dispersability of graphene in the solvents studied. It was known that Elastomer A was soluble in hexane; however, it was learned that Elastomer A is not soluble in ethyl acetate. The following order of decreasing Elastomer A solubility was observed: hexane>50/50 mix hexane/TFIF>THF>50/50 mix hexane/ethyl acetate>ethyl acetate. Further, it was believed that graphene would disperse in hexane but that was not the case. While graphene was readily dispersed in THF, it also dispersed in a 50/50 mix of hexane/THF, in ethyl acetate, and in a 50/50 mix of hexane/ethyl acetate. The following order of decreasing dispersion was observed: 50/50 mix hexane/THF>THF>50/50 mix hexane/ethyl acetate>ethyl acetate>hexane.

Preparation of aminated derivatives of Elastomer A: One hundred grams of Elastomer A were dissolved in 1000 mL of hydrocarbon solvents (hexane or toluene) in a 2-L reactor. Triethylamine was added at three different levels (0.0018, 0.0036 and 0.0072 mole) to the reactor. The reaction mixture was heated to 70° C.-75° C. and for 4 hours. This resulted in amine levels on the polymer of 0.05 mol %, 0.08 mol %, and 0.18 mol %, respectively.

Sixteen samples (8-23) were prepared by high shear mixing Elastomer A, aminated derivatives of Elastomer A, and graphene. To prepare these samples, 95.0 g of Elastomer A was put in a 1 L jar. A 50/50 mix hexane/THF (500 mL) was poured into the jar to dissolve the polymer. To accelerate dissolution of the polymer in solvent, the jar containing the polymer and the solvent was placed overnight on a horizontal shaker at a slow shaking cycle. The aminated derivatives of—Elastomer A were used as 30/70 aminated-Elastomer A/Elastomer A solutions to give the required amount of aminated elastomer (see Table 3 below) and were poured into a 2 L beaker. Expanded Asbury graphite and THF were added to the Elastomer A/aminated-Elastomer A solutions to make the final 1 L volume. This suspension was high-shear mixed at 6500 RPM for 10 minutes. Then further Elastomer A solution was added and an appropriate volume of 50/50 hexane/THF was added to make the final volume 2 L. This suspension was high-shear mixed at 6500 RPM for 20 minutes. The solution was then transferred to a 4 L flask. Excess isopropanol was added to precipitate the Elastomer A/aminated-Elastomer A/graphene mixture. The precipitate was filtered, allowed to dry at room temperature, and then put into a vacuum oven at 80° C. overnight. Finally, the Elastomer A/aminated-Elastomer A/graphene mixture. (36.0 g) was mixed with carbon black, MBTS, $ZnO_2$, and HSt. Table 3 summarizes the absolute oxygen permeability obtained from the aminated Elastomer A/graphene samples that were high sheared mixed.

TABLE 3

| | Aminated rubber | | |
|---|---|---|---|
| Sample | $X_{EG}$ (phr) | Mol % Amination | Oxygen Permeability (cc-mm/m²-day) |
| 8 | 1.0 | 0 | 102.7 |
| 9 | 1.5 | 0 | 91.5 |
| 10 | 3.0 | 0 | 85.7 |
| 11 | 4.0 | 0 | 80.5 |
| 12 | 1.0 | 0.05 | 100.8 |
| 13 | 1.5 | 0.05 | 93.2 |
| 14 | 3.0 | 0.05 | 84.9 |
| 15 | 4.0 | 0.05 | 79.2 |
| 16 | 1.0 | 0.08 | 96.1 |
| 17 | 1.5 | 0.08 | 87.0 |
| 18 | 3.0 | 0.08 | 84.8 |
| 19 | 4.0 | 0.08 | 78.2 |
| 20 | 1.0 | 0.18 | 101.8 |
| 21 | 1.5 | 0.18 | 87.4 |
| 22 | 3.0 | 0.18 | 88.5 |
| 23 | 4.0 | 0.18 | 71.1 |

Figure 2:
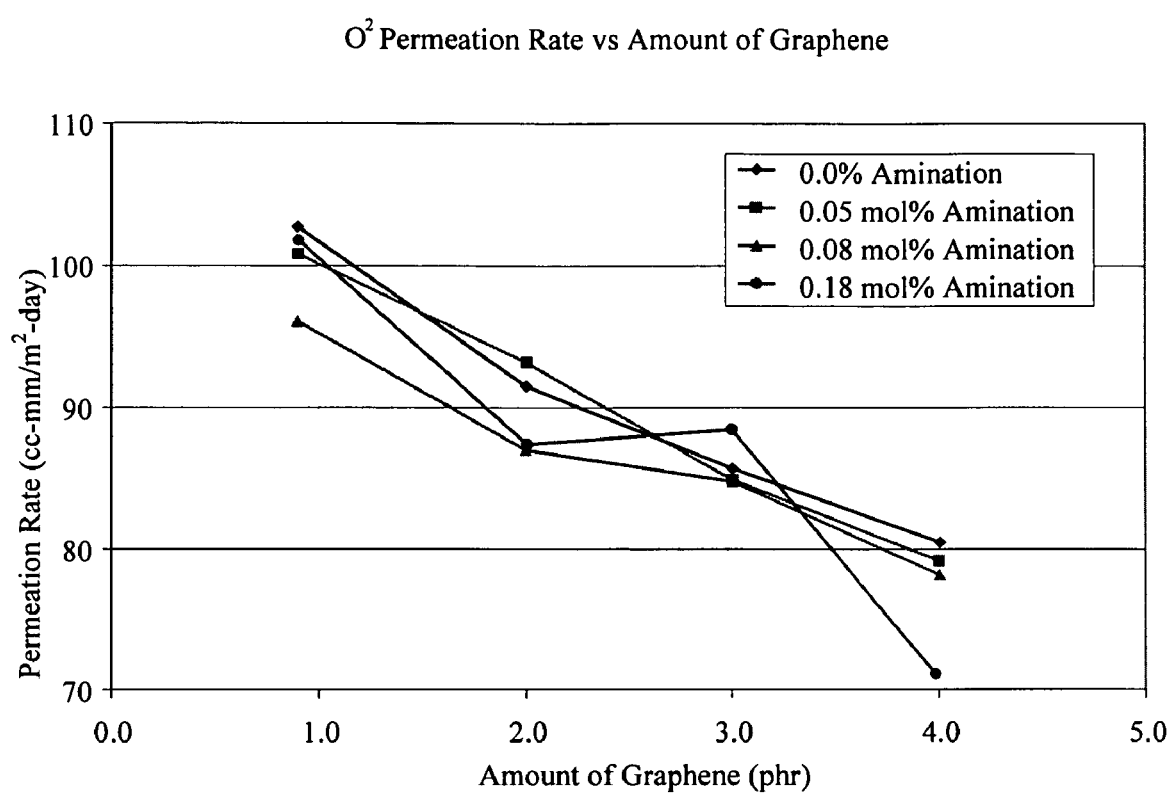
FIG. 2 graphically illustrates oxygen permeation rate versus amount of graphene for in aminated elastomer nanocomposites in accordance with one or more embodiments described.

FIG. 2 graphically illustrates the oxygen permeation rate versus amounts of graphene for the various aminated nanocomposites of Table 3. As shown in Table 3 and FIG. 2, the oxygen permeation rate decreased as the amount of graphene in the nanocomposite increased. It was also observed that the addition of the functionalized elastomer improved the interaction between the slightly polar filler and the slightly polar matrix, decreasing the gaps through which oxygen molecules could travel and lastly improving the barrier properties of the system under study.

Various terms have been defined above. To the extent a term used in a claim is not defined above, it should be given the broadest definition persons in the pertinent art have given that term as reflected in at least one printed publication or issued patent. Furthermore, all patents, test procedures, priority documents and other documents cited in this application are fully incorporated by reference to the extent such disclosure is not inconsistent with this application and for all jurisdictions in which such incorporation is permitted.

What is claimed is:

1. An elastomeric composition, comprising:
   from 0.1 to 20 phr graphite nanoparticles;
   from 1 to 99 wt % of at least one functionalized elastomer component comprising a random copolymer having at least one $C_4$ to $C_7$ isomonoolefin derived unit, wherein the elastomer is functionalized by a combination of a halogen and a triethylammonium group; and
   10 to 200 phr of at least one filler that is not graphite.

2. The composition of claim 1, wherein the random copolymer is selected from the group consisting of a halogenated poly(isobutylene-co-p-methylstyrene), halogenated star-branched butyl rubber, halogenated butyl rubber, and mixtures thereof.

3. The composition of claim 1, further comprising a thermoplastic resin.

4. The composition of claim 1, further comprising a polybutene oil having a number average molecular weight greater than 400 g/mol and less than 10,000 g/mol.

5. The composition of claim 4, wherein the polybutene is present from 2 to 40 phr.

6. The composition of claim 1, wherein the filler is selected from the group consisting of calcium carbonate, clay, mica, silica, silicates, talc, titanium dioxide, starch, wood flour, carbon black, and mixtures thereof.

7. The composition of claim 1, further comprising an exfoliated clay selected from the group consisting of exfoliated natural or synthetic montmorillonite, nontronite, beidellite, volkonskoite, laponite, hectorite, saponite, sauconite, magadiite, kenyaite, stevensite, vermiculite, halloysite, aluminate oxides, hydrotalcite, and mixtures thereof.

8. An innerliner for a tire comprising the composition of claim 1.

9. An elastomeric composition, comprising:
   up to 5.0 phr one or more nanoparticles comprising graphene;
   at least one elastomer component consisting essentially of poly(isoolefin-co-p-methylstyrene); and
   at least one filler that is not graphite.

10. The composition of claim 9, wherein the poly(isoolefin-co-p-methylstyrene) is a halogenated poly(isobutylene-co-p-methylstyrene).

11. The composition of claim 10, wherein the halogenated poly(isobutylene-co-p-methylstyrene) has a p-bromomethylstyrene content of from 0.1 to 10 wt % based on the weight of the copolymer.

12. The composition of claim 9, further comprising a thermoplastic resin.

13. The composition of claim 9, further comprising a polybutene oil having a number average molecular weight greater than 400 g/mol and less than 10,000 g/mol.

14. The composition of claim 13, wherein the polybutene is present from 2 to 40 phr.

15. The composition of claim 9, wherein the filler is selected from the group consisting of calcium carbonate, clay, mica, silica, silicates, talc, titanium dioxide, starch, wood flour, carbon black, and mixtures thereof.

16. The composition of claim 9, further comprising an exfoliated clay selected from the group consisting of exfoliated natural or synthetic montmorillonite, nontronite, beidellite, volkonskoite, laponite, hectorite, saponite, sauconite, magadiite, kenyaite, stevensite, vermiculite, halloysite, aluminate oxides, hydrotalcite, and mixtures thereof.

17. The composition of claim 9, wherein the filler is carbon black.

18. The composition of claim 9, further comprising a secondary elastomer component selected from the group consisting of natural rubbers, polyisoprene rubber, styrene butadiene rubber (SBR), polybutadiene rubber, isoprene butadiene rubber (IBR), styrene-isoprene-butadiene rubber (SIBR), ethylene-propylene rubber, ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; isobutylene/methylstyrene copolymers such as isobutylene/meta-bromomethylstyrene, isobutylene/bromomethylstyrene, isobutylene/chloromethylstyrene, halogenated isobutylene cyclopentadiene, and isobutylene/chloromethylstyrene and mixtures thereof.

19. An innerliner for a tire comprising the composition of claim 9.

20. The composition of claim 1 wherein the elastomer composition is combined with a thermoplastic resin to form a dynamically vulcanized alloy.

21. An air barrier comprising an elastomeric composition comprising:
    from 0.1 to 10 phr graphite nanoparticles;
    from 1 to 99 wt % of at least one elastomer component comprising a random copolymer having at least one $C_4$ to $C_7$ isomonoolefin derived unit;
    a polybutene oil having a number average molecular weight greater than 400 g/mol and less than 10,000 g/mol; and
    10 to 200 phr of at least one filler that is not graphite.

22. An air barrier comprising the composition of claim 1.

23. An air barrier comprising the composition of claim 9.

24. The air barrier of claim 21, wherein the filler is selected from the group consisting of calcium carbonate, clay, mica, silica, silicates, talc, titanium dioxide, starch, wood flour, carbon black, and mixtures thereof.

25. The air barrier of claim 21, further comprising an exfoliated clay selected from the group consisting of exfoliated natural or synthetic montmorillonite, nontronite, beidellite, volkonskoite, laponite, hectorite, saponite, sauconite, magadiite, kenyaite, stevensite, vermiculite, halloysite, aluminate oxides, hydrotalcite, and mixtures thereof.

* * * * *